(12) United States Patent
Muraoka

(10) Patent No.: US 7,202,461 B2
(45) Date of Patent: Apr. 10, 2007

(54) IMAGE-READING APPARATUS

(75) Inventor: Taketoh Muraoka, Hino (JP)

(73) Assignee: Konica Minolta Photo Imaging, Inc., Tokyo (JP)

( * ) Notice: Subject to any disclaimer, the term of this patent is extended or adjusted under 35 U.S.C. 154(b) by 87 days.

(21) Appl. No.: 11/065,513

(22) Filed: Feb. 24, 2005

(65) Prior Publication Data

US 2005/0194517 A1  Sep. 8, 2005

(30) Foreign Application Priority Data

Mar. 4, 2004 (JP) ............................ 2004-060242
Mar. 26, 2004 (JP) ............................ 2004-091334

(51) Int. Cl.
*H01L 27/00* (2006.01)

(52) U.S. Cl. .................... 250/208.1; 250/205; 362/231

(58) Field of Classification Search ............... 250/205, 250/214 R, 208.1; 362/11, 231
See application file for complete search history.

(56) References Cited

U.S. PATENT DOCUMENTS 6,617,559 B1 * 9/2003 Emery et al. ............... 250/205

\* cited by examiner

*Primary Examiner*—Kevin Pyo
(74) *Attorney, Agent, or Firm*—Lucas & Mercanti, LLP

(57) ABSTRACT

There is described an image-reading apparatus to acquire image data by reading a scanned image comprising an image sensor having a light emitting means and a photo receiving means for receiving a light emitted from the light emitting means, and a reading control means for controlling the image sensor. The photo receiving means separately acquires light amount data in a plurality of wavelength regions, and the reading control means independently controls a start and a stop of each of light receiving operations of the photo receiving means conducted in the plurality of wavelength regions. Further, there is also described an image-reading apparatus to acquire image data by reading a scanned image comprising an image sensor having a plurality of light emitting means, light emitting wavelength regions of which are different from each other, and photo receiving means for receiving light emitted from the plurality of light emitting means, and a reading control means for controlling the image sensor, and the reading control means independently controls a start and a stop of each of light emitting operations conducted by the plurality of light emitting means.

15 Claims, 13 Drawing Sheets

FIG. 8 (a) PRIOR ART
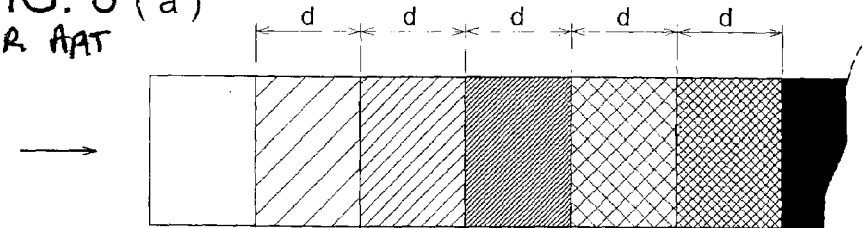
FIG. 8 (b) PRIOR ART
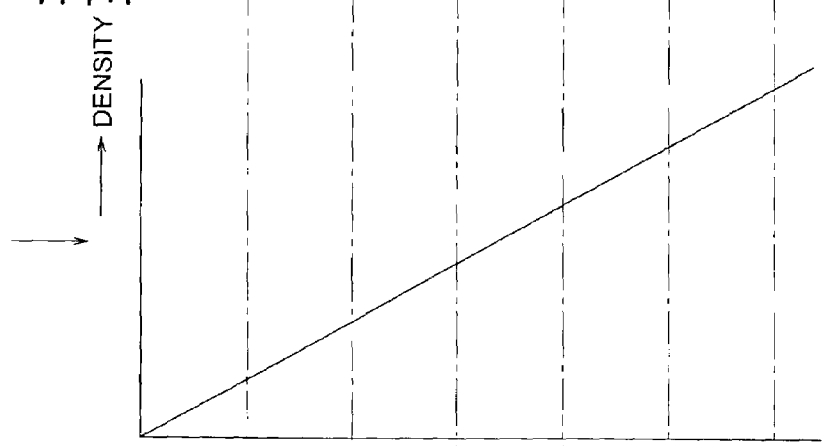
FIG. 8 (c) PRIOR ART
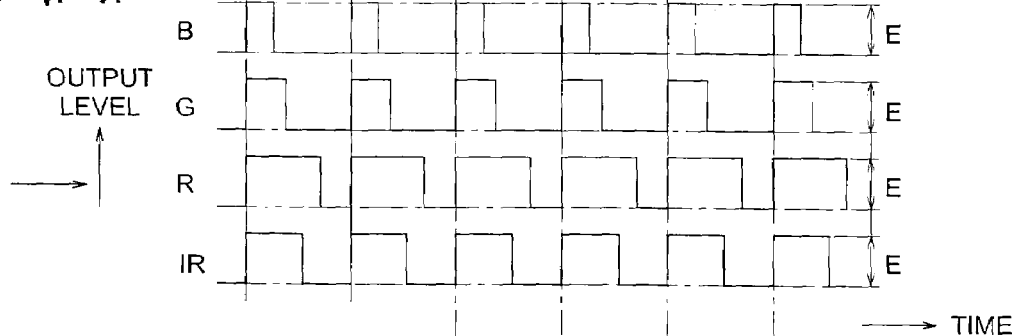
FIG. 8 (d)
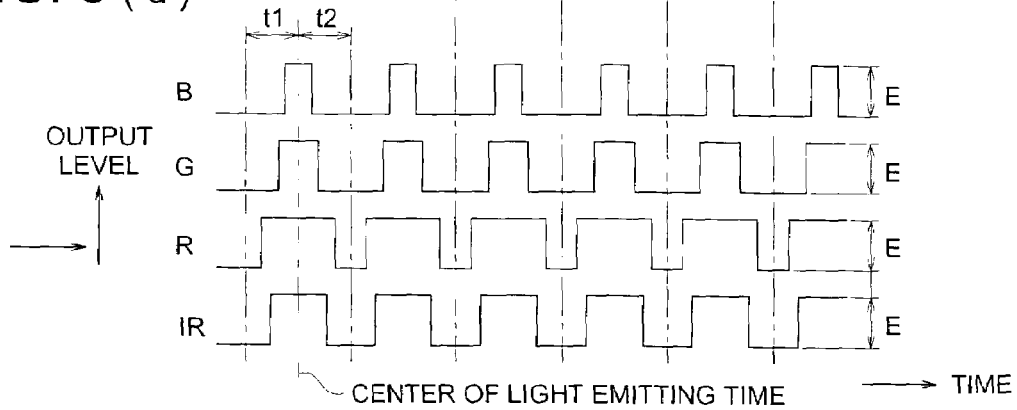

IMAGE-READING APPARATUS

BACKGROUND OF THE INVENTION

The present invention relates to an image-reading apparatus.

In recent years, there has been well-known an image-reading apparatus, which reads an image recorded on a photographic film or a photographic print (hereinafter, referred to as a photographic image, for the general term of them) by means of an image sensor to acquire image data. For instance, a film scanner, being an example of such the image-reading apparatus, acquires the image data by conducting the steps of: irradiating light, emitted from a light emitting means such as a halogen lamp, etc., onto the developed photographic film on which the image is already formed, while conveying the photographic film; photo-electronically reading the light penetrated through the photographic film by means of a photo detecting element, such as a CCD (Charge Coupled Device), a line sensor, etc.; and applying an analogue-to-digital conversion processing (hereinafter, referred to as A/D conversion processing, for simplicity) to the read image signals so as to acquire the digital image data (set forth in Tokkai 2003-110823, Japanese Non-Examined Patent Publication). Further, when the scanner acquires the image data from the photographic print, the photo detecting element receives the light reflected from the photographic print, and then, the same steps as the above will be conducted (set forth in Tokkai 2002-277977, Japanese Non-Examined Patent Publication).

In the conventional image-reading apparatus mentioned in the above, the halogen lamp has been generally employed as the light emitting means for irradiating the light onto the photographic image. It is impossible, however, to control a light emitting amount for every color, when the halogen lamp is employed for the light emitting source. Accordingly, there has been a problem that the color balance of the image reproduced from the read image data would be deteriorated due to the following reasons.

FIG. 1 shows an example of a base penetrated light amount of a negative film for every color.

As shown in FIG. 1, since the base penetrated light amount (defined as an amount of light only penetrated through a substrate, a subbing layer, a filter layer, etc., irrespective of contents of the image, namely, a penetrated light amount at a non-image area) varies with the wavelength range of the light emitted from the light emitting source, namely, colors (here, R (Red), G (Green), B (Blue)), the base penetrated light amounts of colors R, G, B could not coincide with each other, resulting in a deterioration of the color balance. With respect to the reflectivity of the photographic paper for printing use for every color, that goes as well.

According to the description set forth in Tokkai 2003-110823, to cope with the abovementioned problem, the RGB balancing filter is mounted between the light source and the photographic image to be read. As a result, however, the apparatus becomes complicated and large-sized.

As another solution for the abovementioned problem, proposed is a technology for improving the image quality of the read image by employing the LED (light Emitting Diode) as the light emitting source of the image-reading apparatus so as to control the light emitting amount and/or a light amount distribution for every color of the LED (for instance, set forth in Tokkai 2003-233142, Japanese Non-Examined Patent Publication). With respect to the light emitting action of the LED, employed is a method of simultaneously emitting all color lights and stopping the emission of each color light corresponding to the predetermined light amount (namely, the stopping time points of the color lights are different from each other).

Referring to FIG. 8(c), an example of the abovementioned method will be detailed in the following.

FIGS. 8(a)–8(d) show a gradation distribution in a gradation scale as a typical model, indicating a comparison between the gradation distribution and the LED light emitting timing of each color within one scanning period.

FIG. 8(a) shows the gradation scale, while FIG. 8(b) shows a graph of the gradation from highlight to shadow corresponding to the gradation scale as a typical model.

Further, FIG. 8(c) shows a duration time of the light emitting action currently in use of the LED serving as a light emitting source of each color (B, G, R, IR (infrared)), a start-time point of starting the light emitting action and a stop-time point of stopping the light emitting action. The output level of each color light is established at constant level E. Accordingly, the light emitting action of the LED for each color light starts at the same time, and then, stops corresponding to the predetermined light amount of each color.

However, since the gradation distribution exists even within a unit of gradation scale as shown in FIG. 8(a) and FIG. 8(b), the gradation distribution, which can be covered by the timing and the duration of the light emitted by the light emitting element, differs for every color as shown in FIG. 8 (c). On the other hand, since the light receiving element detects the center of integrating the gradation distribution, which corresponds to the distribution of the light receiving amount, as the gradation, the center of integrating the gradation distribution for every color deviates (namely, the detected value of the gradation deviates) even if the gradation scale is the same. This causes a deficiency of deteriorating the color-balance of the reproduced image outputted on the basis of the acquired data.

SUMMARY OF THE INVENTION

According to the present invention, a photo receiving means (hereinafter, also referred to as a light receiving means) of an image sensor equipped in an image-reading apparatus separately acquires light amount data in a plurality of wavelength regions, and a start and a stop of each of light receiving operations, conducted in the plurality of wavelength regions by the photo receiving means, are independently controlled. Since the adjustments of the light amount and the light receiving timing are conducted at the light receiving side in the image sensor, it becomes possible to equalize the base light amount of the light receiving amount for every color even if the controlling operation for light emitting amount is impossible at the light emitting side. This results in a suppression of deteriorating the color-balance of the output image, without requiring the complexity and the large-sizing of the image-reading apparatus.

Further, according to the present invention, a start and a stop of each of light emitting operations, conducted by the plurality of light emitting means of the image sensor equipped in the image-reading apparatus, are independently controlled. Since the start and the stop of each of light emitting operations, conducted by the plurality of light emitting means of the image sensor, are independently controlled, it becomes possible to arbitrarily control the operation of the image sensor. Accordingly, it is also possible to prevent the deviation of the detected value of the gradation of the read image, and it is also possible to prevent the deterioration of the color-balance of the output image.

Still further, according to the present invention, the operations conducted during one scanning interval by the plurality of light emitting means and/or the photo receiving means are controlled, so that a center point for integrating the distribution of light receiving amount in each of the light emitting wavelength regions, to be received during one scanning interval by the photo receiving means, overlaps with that of another light emitting wavelength region. Since the center point for integrating the distribution of light receiving amount in each of the light emitting wavelength regions, to be received during one scanning interval by the photo receiving means, overlaps with that of another light emitting wavelength region within one scanning interval by controlling the light emitting action of the light emitting means or the operations conducted by the photo receiving means of the image sensor, it becomes possible to prevent the deviation of the detected value of the gradation of the read image. Accordingly, it is also possible to provide a stable image-reading apparatus, which forms the output image having no deterioration of the color-balance.

BRIEF DESCRIPTION OF THE DRAWINGS

Other objects and advantages of the present invention will become apparent upon reading the following detailed description and upon reference to the drawings in which:

FIG. 8(a) shows a modeled gradation distribution of a gradation scale, FIG. 8(b) shows a graph of the gradation from highlight to shadow corresponding to the gradation scale as a typical model, FIG. 8(c) and FIG. 8(d) show a duration time of the light emitting action of the LED serving as a light emitting source of each color (B, G, R, IR (infrared));

DETAILED DESCRIPTION OF THE PREFERRED EMBODIMENT

Figure 1:
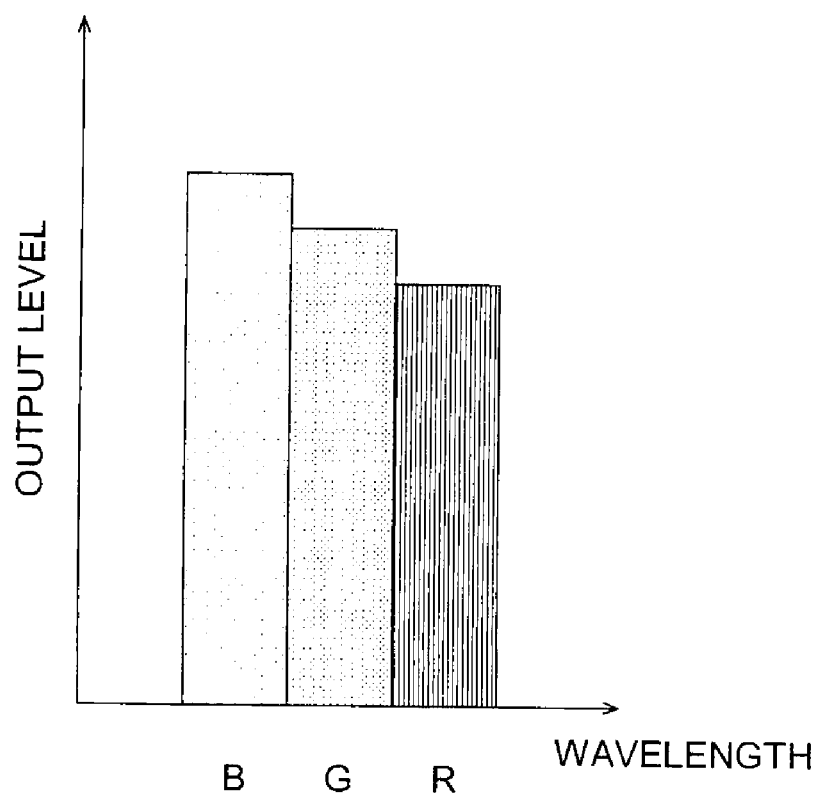
FIG. 1 shows an exemplified graph of a base penetrated light amount of a negative film, indicating for every color.

When the light emitting amount of each color is not controlled, a white LED, namely, a LED having no filter, a halogen lamp or a metal halide lamp can be employed as the light emitting means in the image sensor of the present invention. An array light source in which a light emitting intensity of each of pixel elements can be independently controlled, for instance, in addition to the light emitting array including a plurality of light emitting elements (LED, EL, LD, etc.), the light emitting intensity of each of which can be independently controlled, the light emitting means (PLZT, etc.) in which each of pixel elements is configured as a combination of a single light emitting element and a shutter means being independently controllable, can be desirably employed. Further, a solid-state image sensor formed in a line, such as the CCD line sensor, a photo-diode line sensor (PD), a phototransistor line sensor (PTr), etc., can be desirably employed as the light receiving means.

Referring to the drawings, a film scanner, serving as an image-reading apparatus embodied in the present invention, will be detailed in the following. Incidentally, in the following descriptions for the embodiment of the present invention, the technical scope of the present invention is not limited by the technical terms and the decisive explanations used in the present specification.

Figure 2:
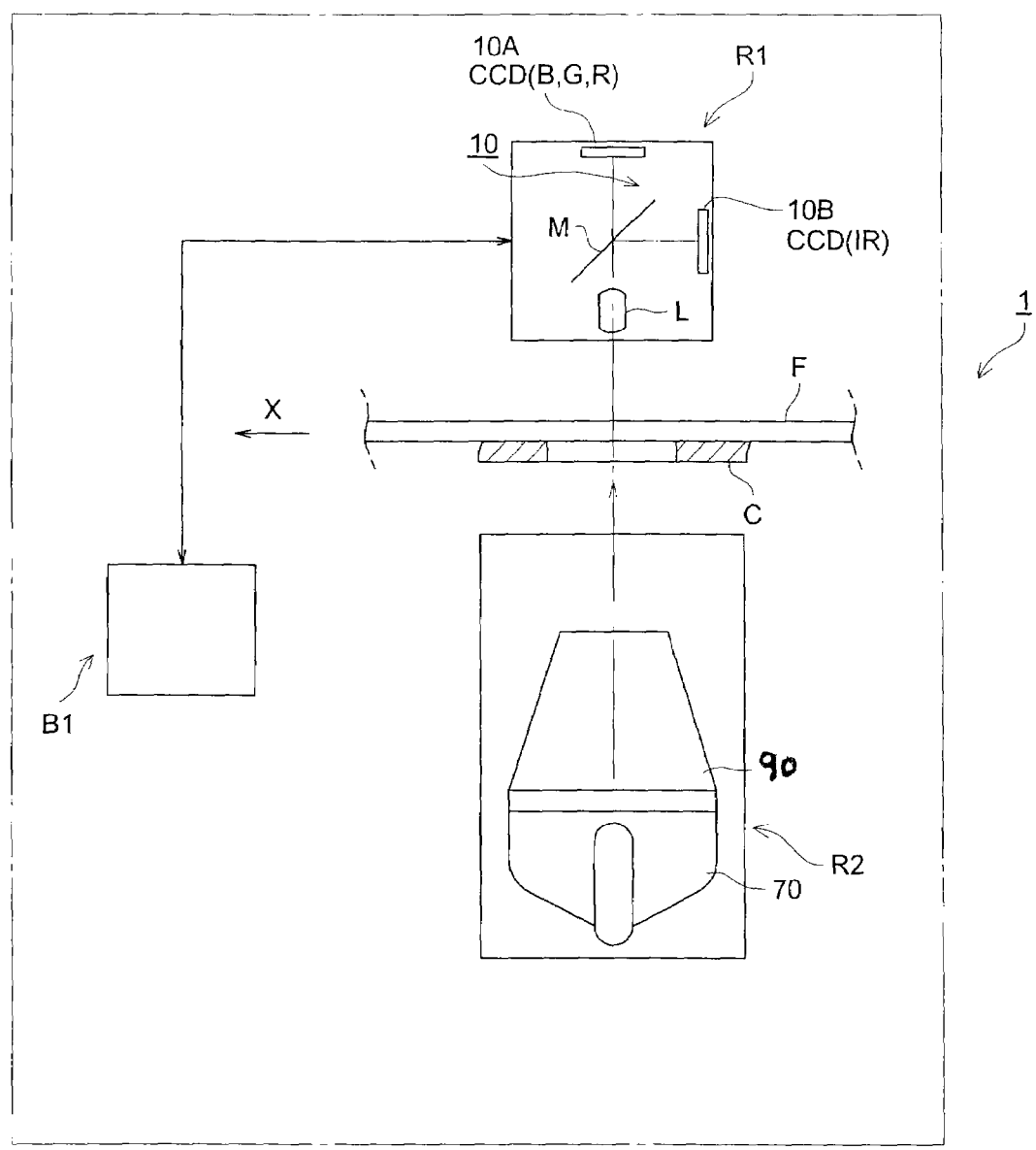
FIG. 2 shows a schematic diagram of an exemplified configuration of an image-reading apparatus embodied in the present invention.

FIG. 2 shows a schematic diagram of an exemplified configuration of an image-reading apparatus embodied in the present invention.

In FIG. 2, numeral 1 indicates an image-reading apparatus. Numeral R1 indicates an image-reading section constituted by CCD 10 including CCD 10A serving as a line sensor (corresponding to B, G, R) and CCD 10B (corresponding to IR (InfraRed)), zooming lens L, half mirror M, etc. Numeral R2 indicates a light source section constituted by light source 70, which emits a light including R, G, B and IR ("B" light emitting), diffusion box 90, etc. Numeral B1 indicates a reading control means, which includes CCD controlling section 60 to adjust starting and stopping operations of CCD 10 corresponding to each color (refer to FIG. 3). Numeral F indicates a negative film being an object to be read, which runs in a direction indicated by the arrow X, while the light emitted from the light source section is penetrating through it.

The light emitted from light source 70 travels in diffusion box 90 to penetrate through negative film F. Each of the penetrate lights (R, G, B), the light intensity of which is modulated in response to the variation of the image density of negative film F, are detected by CCD 10A. On the other hand, the infrared light (IR) is detected by CCD 10B.

The reason why the infrared light is detected is not to detect dirt and dusts as parts of the image when the dirt and dusts are attached to negative film F, since the infrared light does not penetrate through such the dirt and dusts. This is detailed in, for instance, Tokkai 2003-110823 cited in the above.

Figure 3:
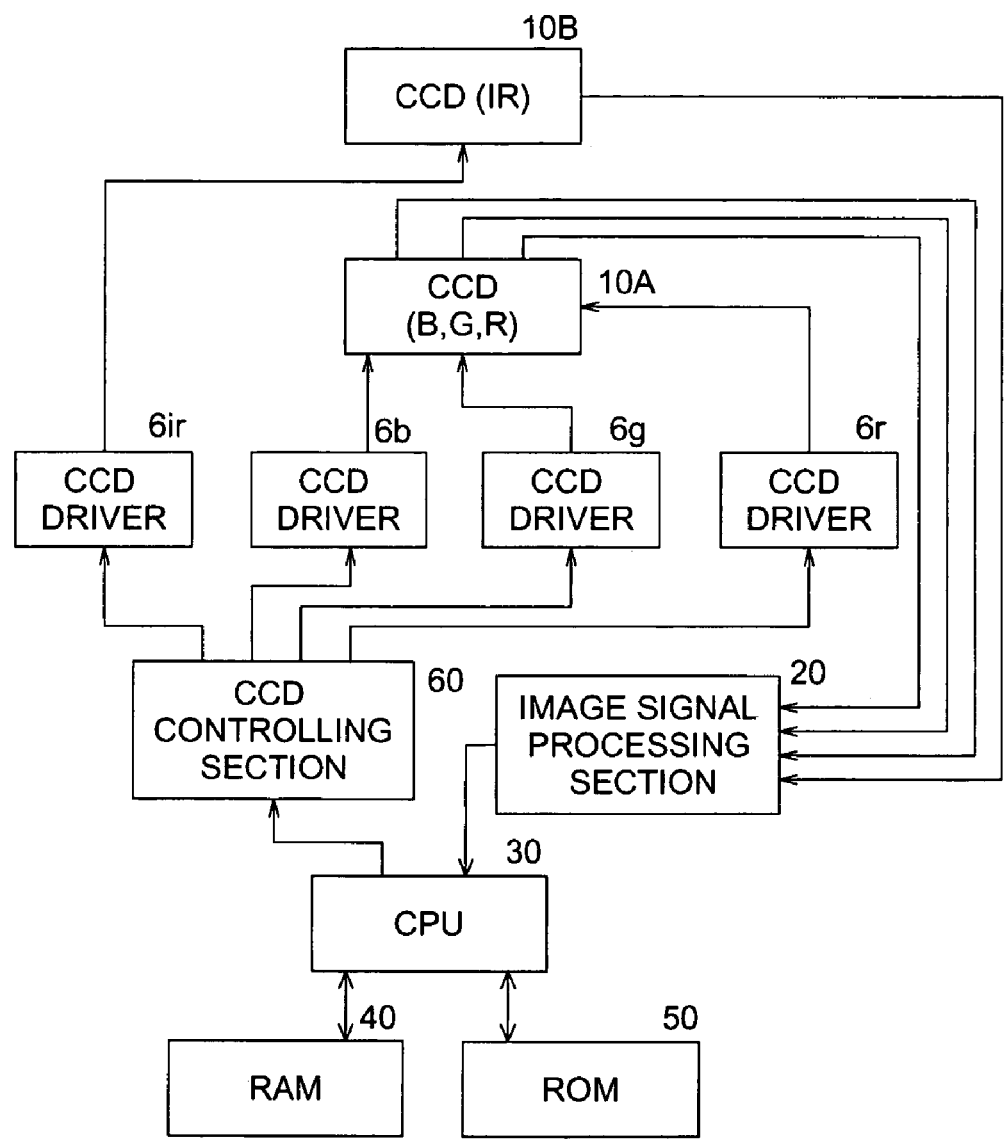
FIG. 3 shows a block diagram of a configuration for controlling CCD operations in the configuration shown in FIG. 2.

FIG. 3 shows a block diagram of an internal configuration of the image sensor embodied in the present invention.

As shown in FIG. 3, CCD 10 including CCD 10A and CCD 10B, image signal processing section 20, CPU 30 (Central Processing Unit), RAM 40, ROM 50, infrared CCD driver 6ir, blue CCD driver 6b, green CCD driver 6g, red CCD driver 6r and CCD controlling section 60 constitute the image sensor equipped in image-reading apparatus 1. Incidentally, image signal processing section 20, CPU 30, RAM 40, ROM 50 and CCD controlling section 60 are included in reading control means B1.

CCD 10 is a line sensor in which several thousands of photo detecting elements are arrayed in a line corresponding to the pixels of the image so as to converts the photo signals, penetrated through negative film F (refer to FIG. 2) and converged onto the line sensor by means of the selfoc lens array (not shown in the drawings), to electronic signals (analogue signals). The analogue signals are further converted to digital signals by means of an analogue-to-digital converter (hereinafter, referred to as A/D converter, for simplicity), and then, the converted digital signals are outputted to image signal processing section 20.

The image signal processing section 20 applies various kinds of signal processing, such as a color balance adjustment, a shading correction, etc., to the digital image signals inputted from the abovementioned A/D converter, and then, outputs the result of each signal processing to CPU 30.

The image signal processing section 20 detects the base density of negative film F, being an object to be read, in order to calculate a photo receiving time of the CCD for each color (B, G, R, IR) so that a photo receiving amount of each color becomes equal to that of other colors on the negative film F concerned. For instance, when output levels of the base penetrated light amounts of negative film F (base density) for colors B, G, R, are different from each other, image signal processing section 20 adjust the photo receiving time for each color through CCD controlling section 60, so that the photo receiving amounts for colors B, G, R, become equal relative to each other. Taking it into account that a noisy image would be formed due to the characteristics of the photo receiving elements in CCD 10 when the photo receiving amount is extremely small, image signal processing section 20 calculates the photo receiving amount for every color, and CCD 10 revises the accumulating time including the starting timing, according to the accumulating time controlling signal inputted from CCD controlling section 60.

The CPU 30 executes various kinds of controlling operations in accordance with the controlling program for the image-reading apparatus, which is stored in ROM 50.

Concretely speaking, based on the light amount value data for each color, inputted from image signal processing section 20, CPU 30 adjusts the CCD photo-receiving time for every color through CCD controlling section 60 serving as controlling means, and then, according to this photo receiving time adjusting data, CPU 30 outputs the driver driving signal for controlling the photo receiving time of the CCD for every color to each of blue CCD driver 6b (B), infrared CCD driver 6ir (IR), red CCD driver 6r (R) and green CCD driver 6g (G).

When CPU 30 executes the various kinds of controlling programs, RAM 40 (Random Access Memory) develops the controlling program in the program storing area (not shown in the drawings) in RAM 40, and temporarily stores data, etc., generated by CPU 30 during the execution of the various kinds of controlling programs, into the data storing area (not shown in the drawings).

The ROM 50 (Read Only Memory) stores the various kinds of controlling programs to be executed by CPU 30 and the data, etc., utilized for various kinds of operations, in advance.

According to the CCD operation controlling signal inputted from CPU 30, CCD controlling section 60 controls the starting timing and the stopping timing of the CCD operation (accumulating time) corresponding to colors R, G, B, IR.

According to the configuration of the apparatus mentioned in the above, several embodiments of the present invention will be detailed in the following.

Figure 4:
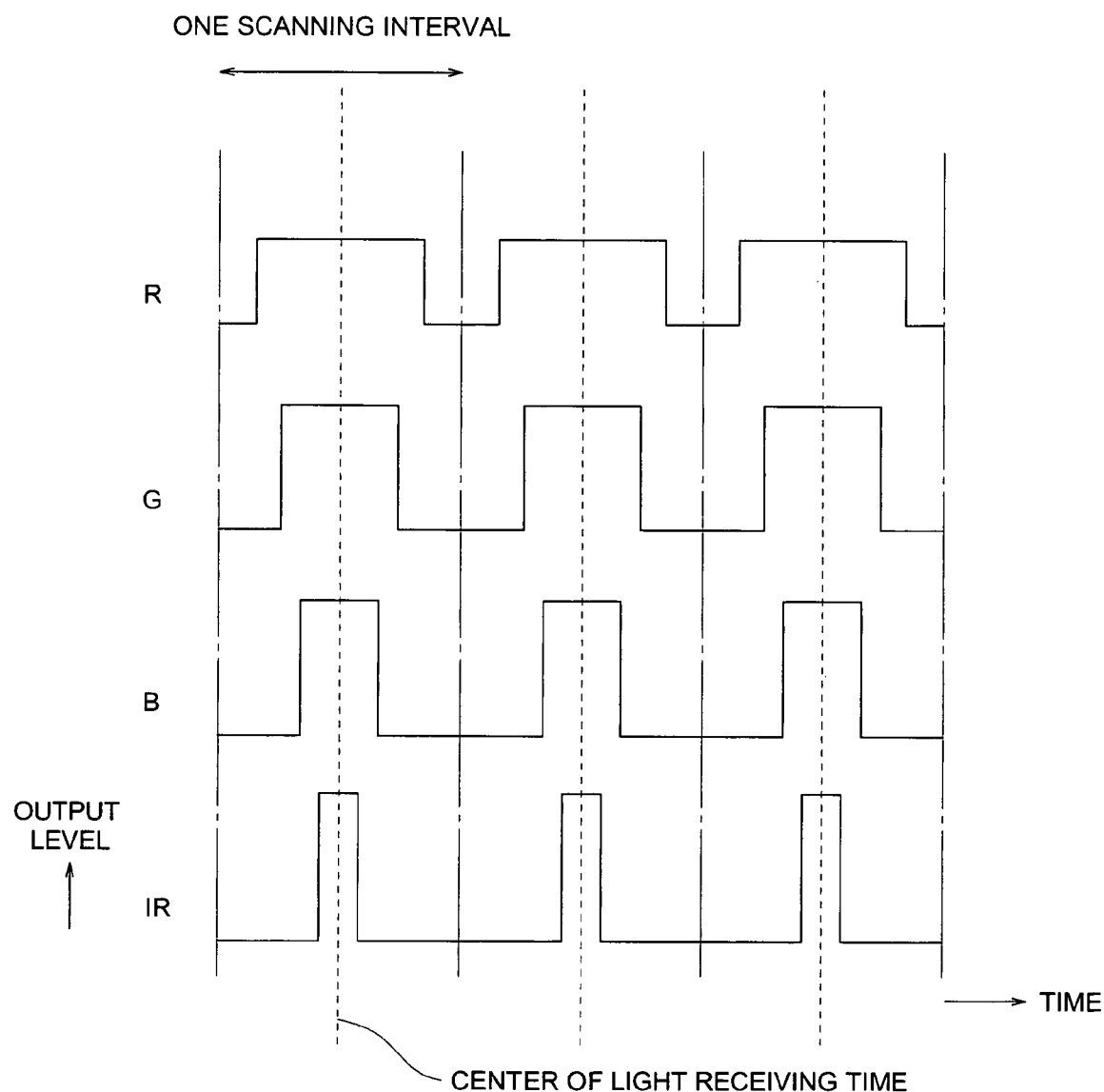
FIG. 4 shows an exemplified time chart of light receiving times of the CCD corresponding to a base penetrated light amount of a negative film.

As shown in FIG. 4, in the first embodiment, reading control means B1 controls the CCD operation so that the centers of the photo receiving times of colors R, G, B, IR coincide with each other during one scanning time interval. It is applicable either to make the center of the photo receiving time coincide with that of one scanning time or not to make.

When the base penetrated light amounts are exhibited as shown in FIG. 1, reading control means B1 adjusts not only the photo receiving amounts by lengthening the photo receiving times in order of B→G→R corresponding to the output levels decreasing in order of B→G→R, but also the center of the photo receiving time corresponding to the scanning operation for the photographic image. Further, since the light source of the halogen lamp, etc., generally exhibits a high intensity of infrared light, the photo receiving time is set at a short time to avoid the saturation of the CCD.

Figure 5:
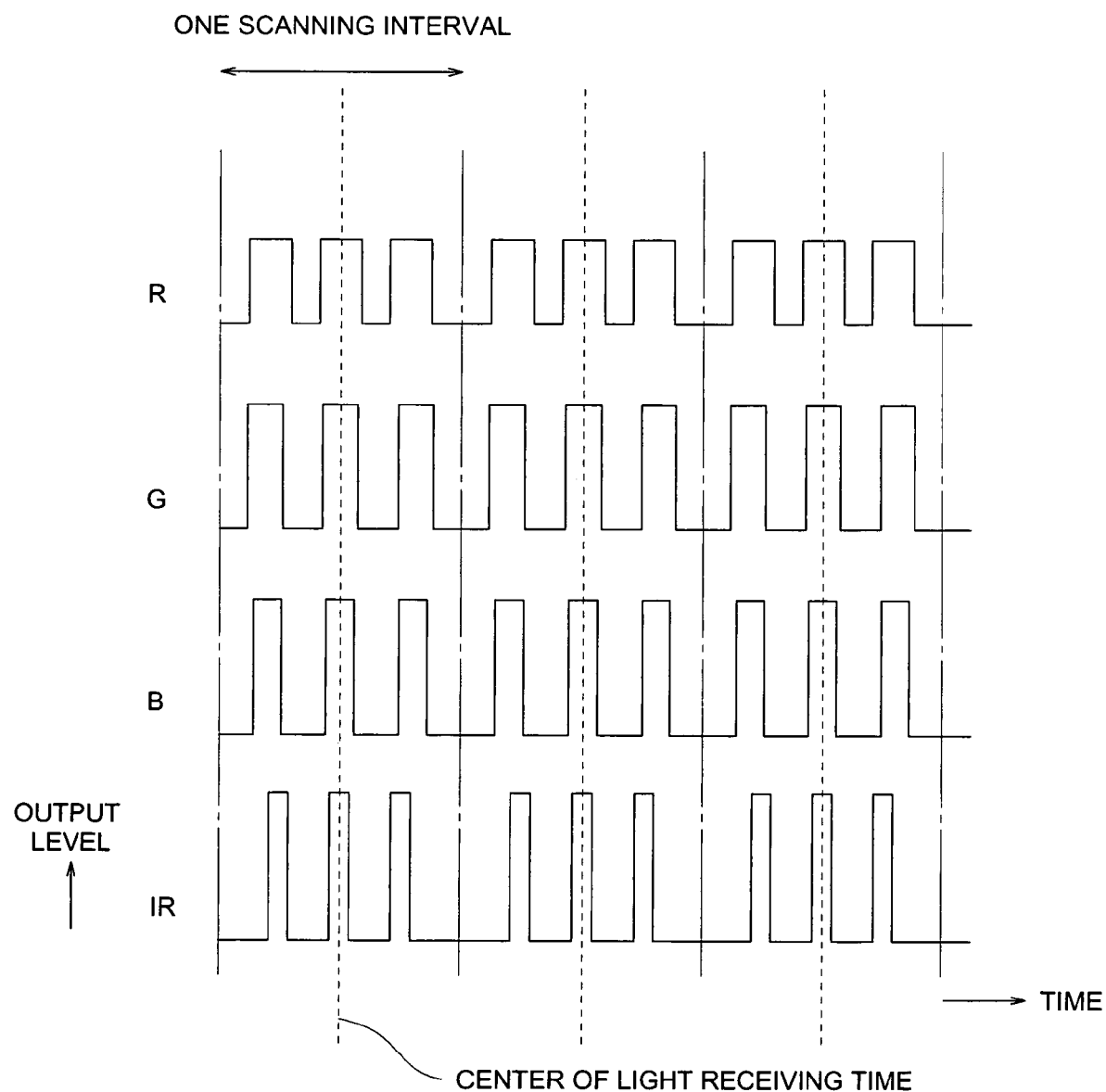
FIG. 5 shows an exemplified time chart of an operation for acquiring data of the light receiving amount in a pulse mode.

As shown in FIG. 5, in the second embodiment, reading control means B1 conducts the photo receiving operation for each color CCD by using a plurality of pulses over one scanning interval to control it so that the integrated value of each data of the photo receiving amount becomes a photo receiving amount necessary for each wavelength region. Further, as shown in FIG. 5, one scanning interval is divided into right and left regions, and the borderline, at which a pulse area of the right region is equal to that of the left region, is established as a center time point of the pulse integrated value. In this photo receiving operation for each color CCD, it is applicable either to make the center time points coincide with each other or not to make.

Further, it is also applicable that reading control means B1 conducts a controlling operation, so that, within a light receiving time in a wavelength region, in which a light receiving time for making the light receiving amount necessary for one scanning operation is the longest, data of the light receiving amount for making the light receiving amount necessary for each scanning operation in another wavelength region are acquired in a mode of equivalent pulses.

The acquiring operation of the data of the photo receiving amount with uniform pulses is achieved by conducting the steps of: sending a reset signal to the CCD driver at the start timing of the reading operation to empty the accumulated charge in the CCD; and repeating the data acquiring operation for necessary times at the stop timing of the reading operation.

Although the abovementioned explanation is applied for the case of detecting the penetrated light, it can be also applied for the case of detecting the reflected light as well. Further, the scope of the receiving means is not limited to the CCD.

Figure 6:
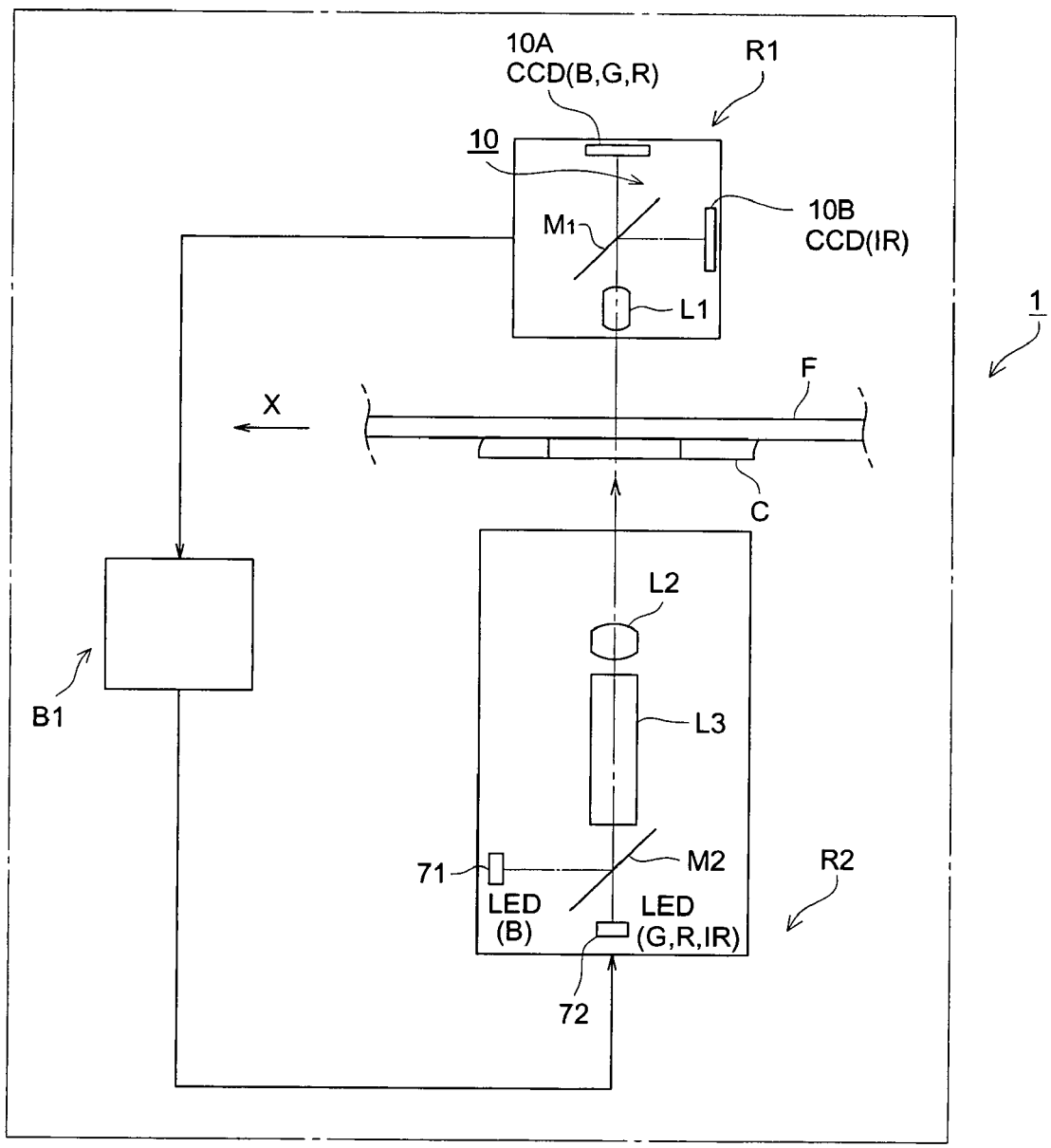
FIG. 6 shows a schematic diagram of another exemplified configuration of an image-reading apparatus embodied in the present invention.

FIG. 6 shows a schematic diagram of another exemplified configuration of an image-reading apparatus embodied in the present invention. Incidentally, the structural elements, being common with those shown in FIG. 2, are attached with the reference numbers same as those shown in FIG. 2, and explanations for them will be omitted in the following.

Figure 7:
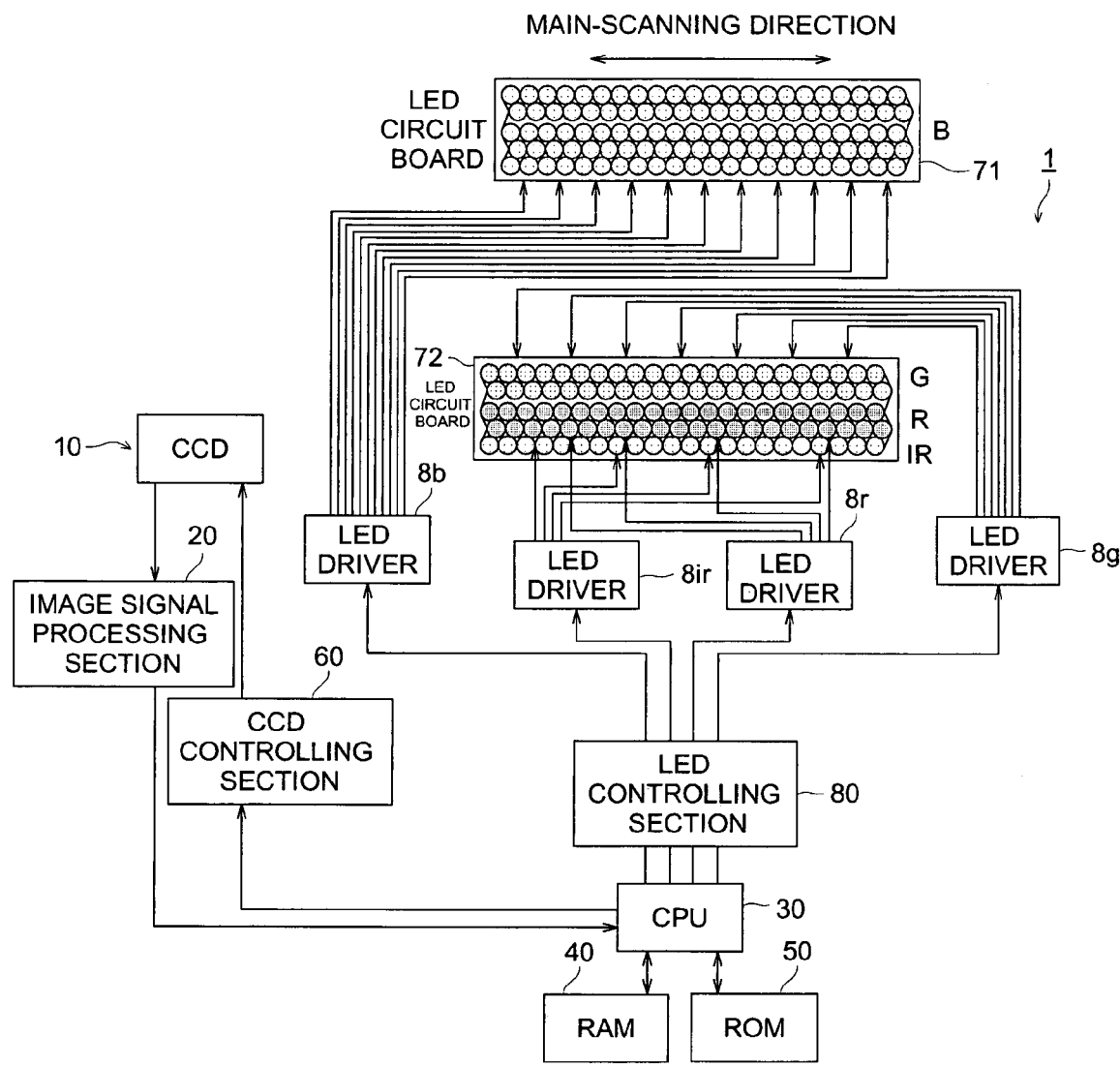
FIG. 7 shows a block diagram of an internal configuration of an image sensor embodied in the present invention.

In FIG. 6, light source section R2 is constituted by rod lens L2 for guiding the light in a single direction, condenser lens L3, half mirror M2, LED light source 71 (B light emission), LED light source 72 (R, G, IR light emission), etc. As shown in FIG. 7, reading control means B1 includes LED controlling section 80 for adjusting start and stop timings of light emitting actions in LED light source 71 and LED light source 72 or output levels (light emitting amounts) of them, and CCD controlling section 60 for adjusting start and stop timings of the operations of CCD 10 corresponding to each of colors of the LED light sources. Negative film F is putted on carrier C to run while the light emitted from rod lens L2 penetrates through it.

The light emitted from LED light source 71 and LED light source 72 passes through half mirror M2, condenser lens L3 and rod lens L2 so as to penetrate through negative film F. The lights (R, G, B), modulated in response to the variations of the image density in the negative film F, are detected by CCD 10A through zoom lens L1 and half mirror M1. On the other hand, the infrared light (IR) is reflected by half mirror M1 to be detected by CCD 10B.

Incidentally, the reason why the infrared light is added to the light source is not to detect dirt and dusts as parts of the image when the dirt and dusts are attached to negative film F, since the infrared light does not penetrate through such the dirt and dusts.

The signals converted from the lights inputted into CCD 10A and CCD 10B are transmitted to reading control means B1 so that LED controlling section 80 (refer to FIG. 7), included in reading control means B1, controls the light emitting timings, the output levels, etc. Incidentally, contents of this controlling operation will be detailed later on.

FIG. 7 shows a block diagram of the internal configuration of the image sensor embodied in the present invention.

As shown in the block diagram of FIG. 7, the image sensor of image-reading apparatus 1 is constituted by CCD 10 including CCD 10A and CCD 10B, image signal processing section 20, CPU 30, RAM 40, ROM 50, blue LED driver 8b, infrared LED driver 8ir, red LED driver 8r, green LED driver 8g, LED light source 71, LED light source 72 and CCD controlling section 60. Incidentally, reading control means B1 includes image signal processing section 20, CPU 30, RAM 40, ROM 50, LED controlling section 80 and CCD controlling section 60.

CCD 10 converts the photo signals, penetrated through negative film F and projected onto the line sensor by means of the selfoc lens (not shown in the drawings), to electronic signals (analogue signals). The analogue signals are further converted to digital signals by means of the A/D converter (not shown in the drawings.), and then, the converted digital signals are outputted to image signal processing section 20. Further, CCD 10 revises the accumulating time, according to the accumulating time controlling signal inputted from CCD controlling section 60.

The image signal processing section 20 applies the color balance processing, the shading correction processing, etc., to the digital image signals inputted from the abovementioned A/D converter to output the processing results to CPU 30.

Figure 9:
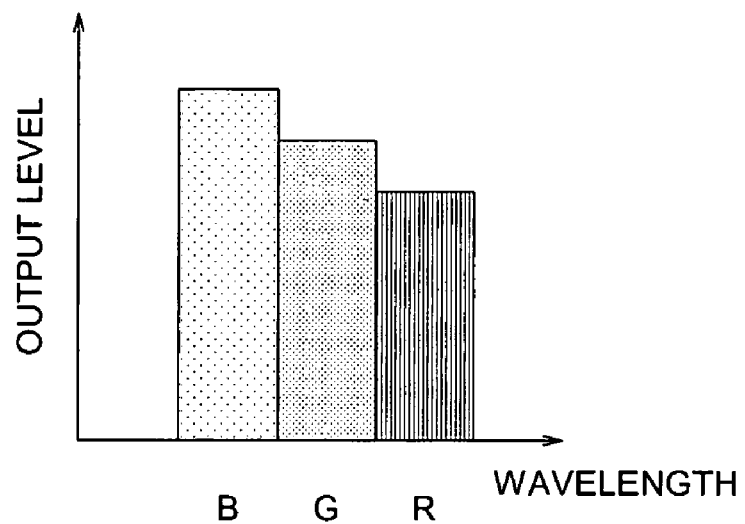
FIG. 9(a) and FIG. 9(b) show graphs of output levels of each LED.
Figure 9:
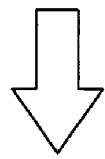
Figure 9:
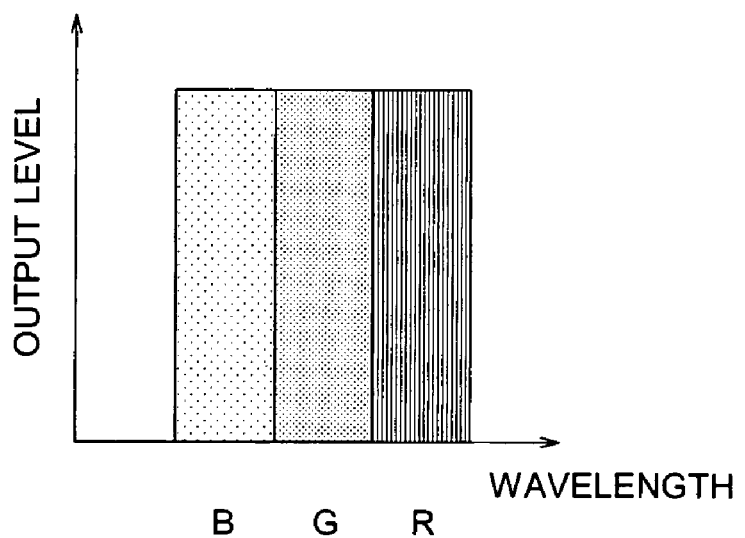

The image signal processing section 20 detects the base density of negative film F, serving as a reading object, in order to calculate the light amount value of each color (B, G, R, IR) so that the penetrated light amounts of colors B, G, R, IR of negative film F become equal relative to each other. FIG. 9(a) and FIG. 9(b) show graphs of output levels of each LED. For instance, when the output levels of the base penetrated light amounts of negative film F (base density) are different for every color (B, G, R), as shown in FIG. 9(a), image signal processing section 20 adjusts the light amounts through LED controlling section 80 so that the penetrated light amounts of colors B, G, R become equal relative to each other as shown in FIG. 9(b). In the example shown in FIG. 9, the light amount of each color is calculated so that the penetrated light amounts of colors B, G, R become equal relative to each other by intensifying the light amounts of red and green components of the light.

The CPU 30 executes various kinds of controlling operations according as the controlling program used for image-reading apparatus and stored in ROM 50.

Concretely speaking, based on the data of light amount value of each color inputted from image signal processing section 20, CPU 30 adjusts the light amount emitted from the LED light source through LED controlling section 80, serving as a controlling means. Further, according to this light amount adjusting data, CPU 30 outputs the driver driving signals for controlling the light amount emitted from the LED light source for every color to each of blue LED driver 8b, infrared LED driver 8ir, red LED driver 8r and green LED driver 8g.

Further, based on the light amount correction data, on CCD 10 serving as a line sensor, inputted from image signal processing section 20, CPU 30 adjusts the emitted light amount for each of blocks divided in the main-scanning direction of LED light source 71 and LED light source 72. According to this light amount adjusting data, CPU 30 outputs the driver driving signals for controlling the light amount emitted from the LED light source for each of blocks of LED light source 71 and LED light source 72 to each of blue LED driver 8b, infrared LED driver 8ir, red LED driver 8r and green LED driver 8g. Incidentally, the line sensors of CCD 10 are arrayed in the same direction as the main-scanning direction mentioned in the above.

In addition to the light amount value to be emitted by each of LED light source 71 and LED light source 72, the information indicated by the driver driving signals designate a controlling method of the light amount. As the controlling method of the light amount, an electronic current controlling method for controlling the light amount by changing the electronic current to be supplied into the light source and a PWM (Pulse Width Modulation) controlling method for controlling the light amount by changing the blinking intervals of the blinking operation of the LED light source are employed.

In the electronic current controlling method, the light amount can be fluctuated by changing the amplitude of the electronic current to be supplied into LED light source 71 and LED light source 72.

Figure 10:
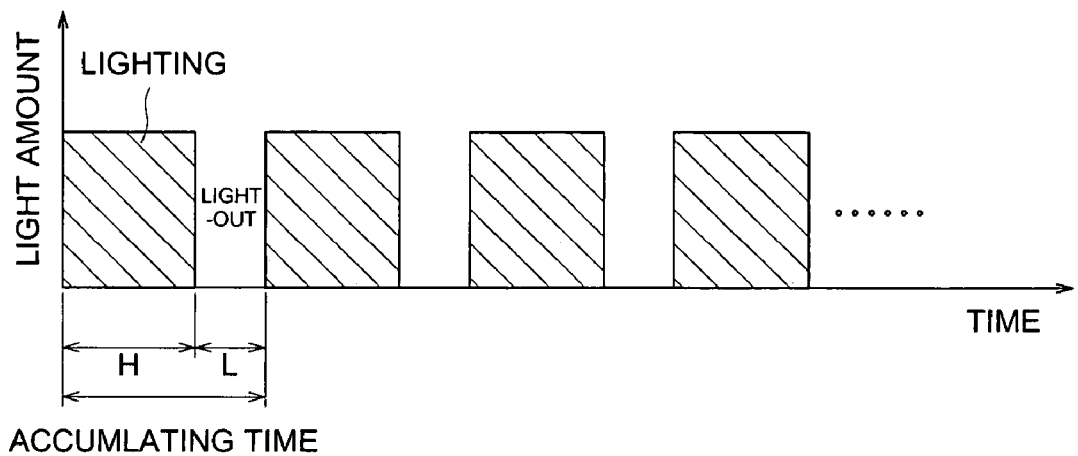
FIG. 10(a) and FIG. 10(b) show relationships between an accumulating time of the CCD and a light emitting action of the LED.
Figure 10:
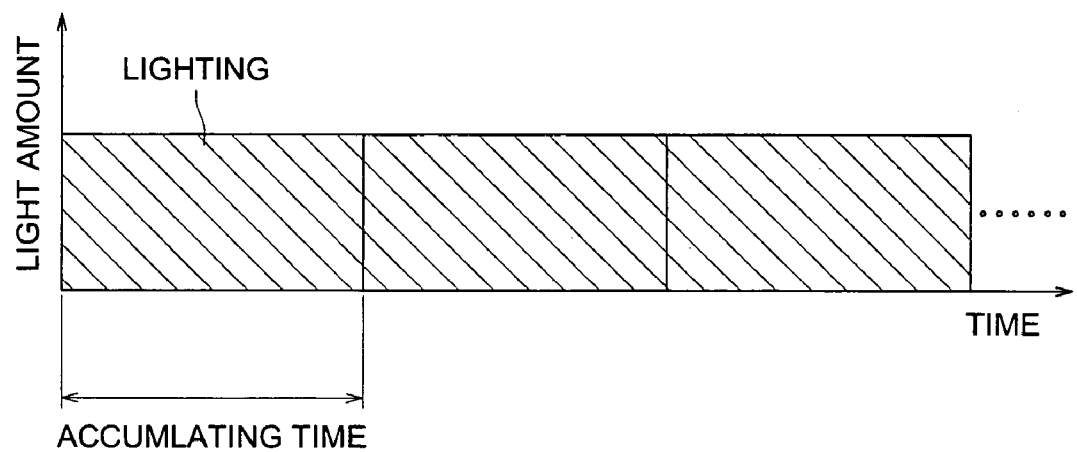

FIG. 10(a) and FIG. 10(b) show relationships between the accumulating time of the CCD and the light emitting action of the LED.

In the PWM controlling method as shown in FIG. 10(a), the pulse width is modulated within one period of the accumulating time of CCD 10, and the height of the pulse represents the level of the light amount, and time interval H represents a duration of the light emitting action (lighting time), and time interval L represents a duration of the light turning-off action. In this PWM controlling method, the light emitting amount varies in response to the value of duty ratio ((lighting time/accumulating time)×100). In other words, by changing the lighting time within one accumulating time, the light emitting amount of the LED is adjusted. In the PWM controlling method, the relationship between the duty ratio and the output level of CCD 10 is linear.

Further, in order to adjust the light emitting level outputted from CCD 10, CPU 30 outputs the accumulating time controlling signal to CCD controlling section 60 to revise the accumulating time of CCD 10. For instance, when the light emitting level is not reached to the light amount value calculated by image signal processing section 20 even if the duty ratio is set at 100%, it is possible to increase the output level of CCD 10 by lengthening the accumulating time of CCD 10 as shown in FIG. 10(b). Incidentally, it is possible to employ either the electronic current controlling method or the PWM controlling method, or both of them as the controlling method of the light amount.

Figure 11:
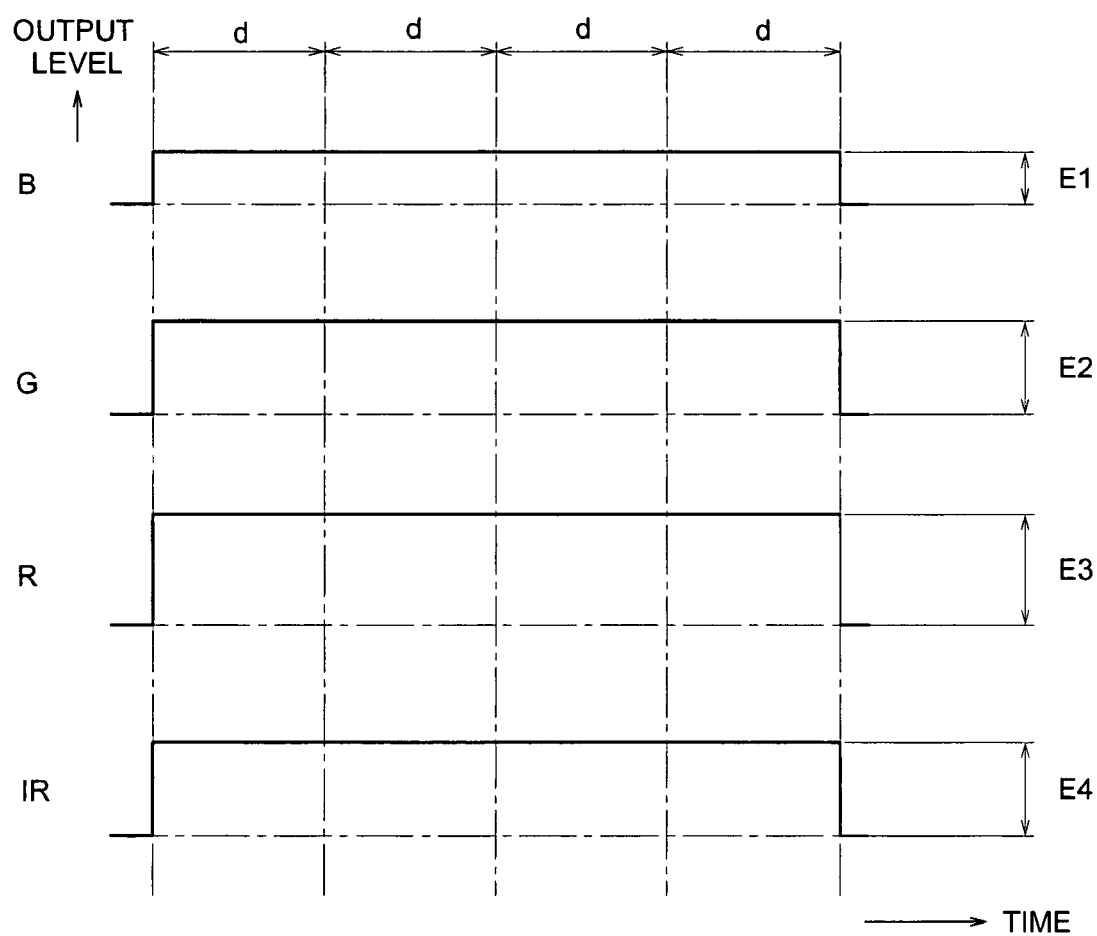
FIG. 11 shows time charts of output levels when the light emitting time durations for colors R, G, B, IR are kept constant in a range of one scanning line.

In the embodiment of the present invention shown in FIG. 8(d), the PWM controlling method is employed, while, in the embodiment of the present invention shown in FIG. 11, the electronic current controlling method is employed as the controlling method of the light amount.

In the configuration shown in FIG. 7, when CPU 30 executes the various kinds of controlling programs, RAM 40 develops the controlling program in the program storing area (not shown in the drawings) in RAM 40, and temporarily stores data, etc., generated by CPU 30 during the execution of the various kinds of controlling programs, into the data storing area (not shown in the drawings).

The ROM 50 stores the various kinds of controlling programs to be executed by CPU 30 and the data, etc., utilized for various kinds of operations, in advance.

As shown in FIG. 7, in response to the driver driving signal inputted from CPU 30, LED controlling section 80 independently control the light emitting amount for each of blocks divided in the main-scanning direction within the region of LED light source 71 (blue light source) through blue LED driver 8b.

As well as the above, LED controlling section 80 independently control the light emitting amount for each of blocks divided in the main-scanning direction within each of the regions of infrared, red, green colors emitted from LED light source 72 through infrared LED driver 8ir, red LED driver 8r and green LED driver 8g.

As shown in FIG. 7, on the printed circuit board of LED light source 71, the blue LED elements are arrayed lengthwise and crosswise like a honeycomb pattern, and divided into blocks in the main-scanning direction. The blue LED driver 8b controls each of the blue LED elements in a unit of every block.

As shown in FIG. 7, on the single printed circuit board of LED light source 72, the green LED elements, the red LED elements and the infrared LED elements are respectively arrayed lengthwise and crosswise like a honeycomb pattern, and respectively divided into blocks in the main-scanning direction. The infrared LED driver 8ir, red LED driver 8r and green LED driver 8g control each of the infrared LED elements, the red LED elements and the green LED elements in a unit of every block, respectively.

In response to the accumulating time controlling signal inputted from CPU 30, CCD controlling section 60 controls the accumulating time of CCD 10. Alternatively, in response to the CCD controlling signal corresponding to the LED controlling signal inputted from CPU 30, CCD controlling section 60 controls the start and stop of the CCD operation (accumulating time) corresponding to the colors R, G, B, IR. Incidentally, it is applicable to conduct either only the controlling operation of the LED light emitting action without conducting the controlling operation of the CCD or only the controlling operation of the CCD without conducting the controlling operation of the LED light emitting action, or the combination of them.

Figure 13:
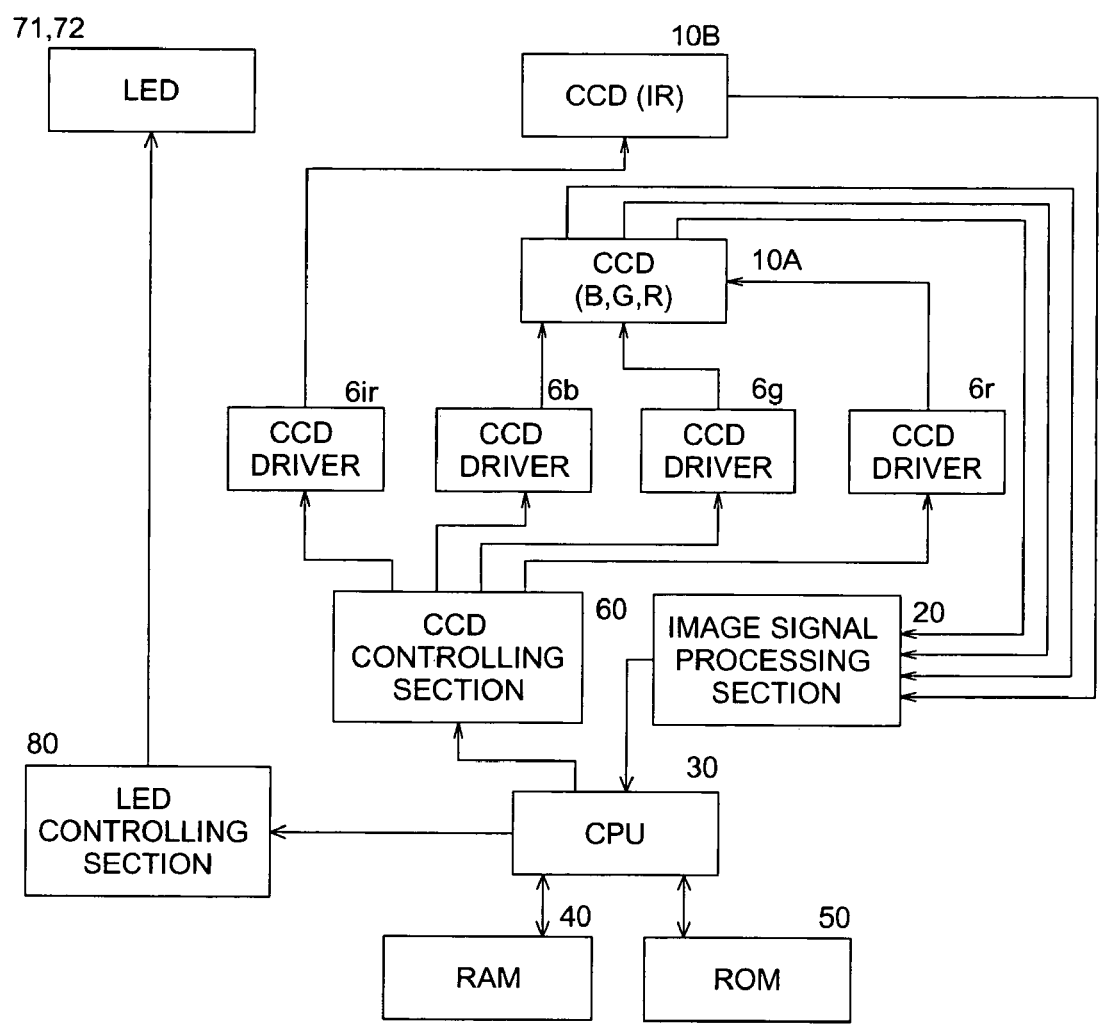
FIG. 13 shows a block diagram of a configuration for conducting a controlling operation of the CCD in the configuration shown in FIG. 6.

FIG. 13 shows a block diagram of the configuration for conducting the controlling operation of the CCD. The flowchart for the controlling operation conforms to that for the LED controlling operation mentioned in the above.

According to the configuration of the apparatus mentioned in the above, several embodiments of the present invention will be detailed in the following.

In the third embodiment, reading control means B1 independently controls the start and stop of the light emitting action of the each color LED. As shown in FIG. 8(d), reading control means B1 controls the CCD operation so that the centers of the photo emitting times of colors R, G, B, IR coincide with each other, while maintaining the light emission output levels of colors R, G, B, IR at level E. It is applicable either to make the center of the photo emitting time coincide with that of one scanning time interval or not to make. According to this embodiment, the center of the photo emitting time of each LED is located at the same time point within one scanning line d (in FIG. 8, t1=t2, or t1≠t2). Accordingly, since the center of integrating the distribution of light receiving amount received by the light receiving means for each color overlaps with that of another color, it becomes possible to prevent the deviation of the detected value of the density of the read image for every color, and therefore, it is possible to suppress the deterioration of the color balance in the output image.

FIG. 11 shows time charts of output levels when the light emitting time durations for colors R, G, B, IR are kept constant in a range of one scanning line.

In the fourth embodiment, reading control means B1 sets the start times and the stop times of the light emitting actions of all color LEDs at the same start time point and the same stop time point, respectively (namely, makes the scanning times for one scanning line d the same), as shown in FIG. 11. Then, reading control means B1 controls the light emission output level of each LED, corresponding to the base density of negative film F. It is applicable that the lighting time of the LED light source is either the same as one scanning time or different from one scanning time. According to this method, since output duration time of each color to be read by CCD 10 is kept constant, it becomes possible to prevent the deviation of the detected value of the density of the read image for every color, and it is possible to maintain the color balance of the output image only by adjusting each of output levels E1, E2, E3, E4, of the LEDs.

Figure 12:
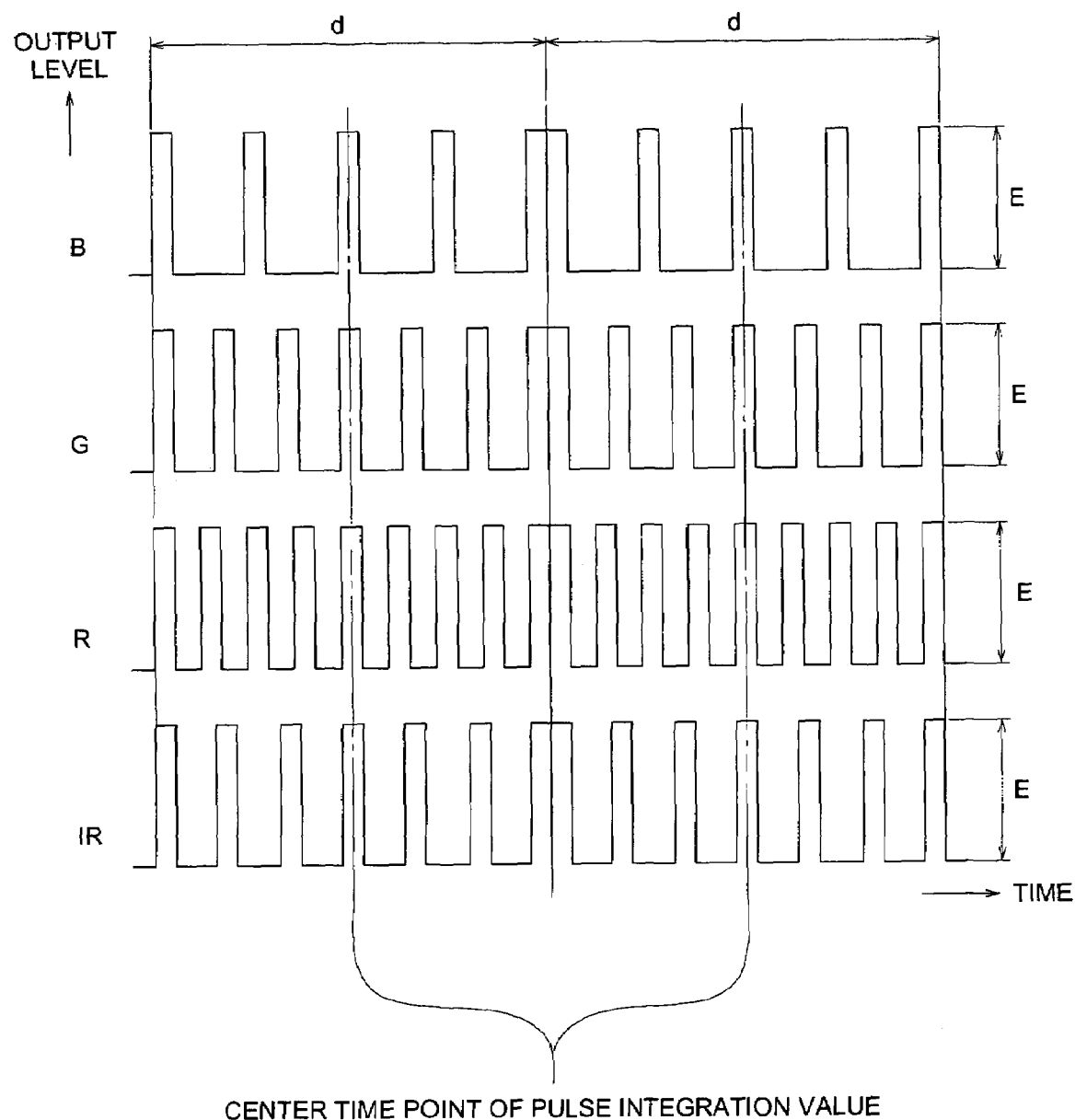
FIG. 12 shows time charts of output levels when a plurality of pulses trigger the light emitting actions for colors R, G, B, IR in a range of one scanning line.

FIG. 12 shows time charts of output levels when a plurality of pulses trigger the light emitting actions for colors R, G, B, IR in a range of one scanning line.

In the fifth embodiment, reading control means B1 makes each of the LEDs emit light by applying a plurality of pulses having an equal pulse width in a range of one scanning line as shown in FIG. 12, and controls the light emitting action of each LED so that the integrated value of the output pulses is equivalent to the light emitting amount necessary for each light emitting wavelength region.

Further, as shown in FIG. 12, one scanning interval is divided into right and left regions, and the borderline, at which the pulse area of the right region is equal to that of the left region; is established as a center time point of the pulse integrated value. In this light emitting operation for each LED, it is applicable either to make the center time points coincide with each other or not to make. Further, it is applicable to make light emitting output levels E of the LEDs either the same or different from each other.

Still further, it is applicable to conduct a controlling operation, so that, within a light emitting time of a LED of a color in which a light emitting time for making the light emitting amount necessary for one scanning operation is the longest, the light emitting action for making the light emitting amount necessary for each scanning operation conducted by a LED of another color is conducted in a mode of equivalent pulses. As well as the above, in this light emitting operation for each LED, it is applicable either to make the center time points coincide with each other or not to make. Further, it is applicable to make light emitting output levels E of the LEDs either the same or different from each other.

According to the method mentioned in the above, since, in a range of one scanning line or within a light emitting time of a LED of a color in which a light emitting time for making the light emitting amount necessary for one scanning operation is the longest, the light amount is uniformly diffused, the center point for integrating the distribution of light receiving amount in each of the light emitting wavelength regions, to be received during one scanning interval by the photo receiving means, overlaps with that of another light emitting wavelength region within one scanning interval by controlling the light emitting action of the light emitting means or the operations conducted by the photo receiving means of the image sensor. Accordingly, it becomes possible to prevent the deviation of the detected value of the gradation of the read image for every color. Further, it is also possible to suppress the deterioration of the color-balance of the output image.

In the sixth embodiment, reading control means B1 controls the light emitting operation so that the start and stop of the CCD operation for each color LED correspond to the start and stop of the light emitting action of the concerned LED (namely, arbitrarily establishing the accumulating time of the CCD or its start time in accordance with the light emitting action of the LED). This is already mentioned in the foregoing.

As described in the foregoing, since the center of integrating the distribution of light receiving amount received by the light receiving means for each color overlaps with that of another color by controlling the light emitting action of the LED or the CCD operation, it becomes possible to prevent the deviation of the detected value of the density of the read image for every color, and therefore, it is possible to provide a stable image-reading apparatus, which generates no deterioration of the color balance in its output image.

Further, by configuring the image-reading apparatus so as to independently control the start and stop of the light emitting action for each of a plurality of light emitting means, serving as image sensors, it becomes possible to arbitrarily conduct the controlling operation for the image sensor. Accordingly, it becomes possible to prevent the deviation of the detected value of the density of the read image for every color, and therefore, it is needless to say that a stable image-reading apparatus, which generates no deterioration of the color balance in its output image, can be provided.

Although only the case of detecting the penetrated light has been described in the foregoing, the abovementioned explanation can be also applied to the case of detecting the reflected light in a similar manner. Further, the combination of light emitting means and photo receiving means is not limited to that of the LED and the CCD.

Disclosed embodiment can be varied by a skilled person without departing from the spirit and scope of the invention.

What is claimed is:

1. An image-reading apparatus to acquire image data by reading a scanned image, comprising
    an image sensor having a plurality of light emitting means, light emitting wavelength regions of which are different from each other, and photo receiving means for receiving light emitted from the plurality of light emitting means,
    a reading control means for controlling the image sensor, wherein,
    said reading control means independently controls a start and a stop of each of light emitting operations conducted by the plurality of light emitting means, and wherein
    light emitting outputs of the plurality of light emitting means are made to be same, and centers of light emitting times for one scanning operation are made to coincide with each other.

2. The image-receiving apparatus of claim 1, wherein; said centers of the light emitting time is made to coincide with a center of one scanning time.

3. The image-reading apparatus of claim 1, wherein; the reading control means makes start time points and stop time points of light emitting actions, conducted by the plurality of light emitting means, same as each other, and controls them so as to adjust each of light emitting outputs.

4. The image-reading apparatus of claim 3, wherein; each of light emitting times of the plurality of light emitting means is set at one scanning time.

5. The image-reading apparatus of claim 1, wherein; the reading control means makes each of the plurality of light emitting means emit light by applying a plurality of pulses having an equal pulse width in a range of one scanning line, and controls a light emitting action of each of the plurality of light emitting means so that an integrated value of output pulses is equivalent to a light emitting amount necessary for each light emitting wavelength region.

6. The image-reading apparatus of claim 1, wherein; the reading control means conducts a controlling operation, so that, within a light emitting time in a wavelength region in which a light emitting time for making the light emitting amount necessary for one scanning operation is the longest, the light emitting action for making the light emitting amount necessary for each scanning operation conducted by a light emitting means in another wavelength region is conducted in a mode of equivalent pulses.

7. The image-reading apparatus of claim 1, wherein; the reading control means conducts a controlling operation, so as to make a start and a stop of an operation of each of the photo receiving means, corresponding to each of the light emitting wavelength regions of the plurality of light emitting means, correspond to the start and the stop of a light emitting action of a light emitting means concerned.

8. An image-reading apparatus to acquire image data by reading a scanned image, comprising
    an image sensor having a plurality of light emitting means, light emitting wavelength regions of which are different from each other, and a photo receiving means for receiving light emitted from the plurality of light emitting means,
    a reading control means for controlling the image sensor, wherein;
    said reading control means controls operations conducted during one scanning interval by the plurality of light emitting means and/or the photo receiving means, so that a center point for integrating the distribution of light receiving amount in each of the light emitting wavelength regions, to be received during one scanning interval by the photo receiving means, overlaps with that of another light emitting wavelength region.

9. The image-receiving apparatus of claim 8, wherein;
light emitting outputs of the plurality of light emitting means are made to be same, and centers of light emitting times for one scanning operation are made to coincide with each other.

10. The image-receiving apparatus of claim 9, wherein;
said centers of the light emitting time is made to coincide with a center of one scanning time.

11. The image-reading apparatus of claim 8, wherein;
the reading control means makes start time points and stop time points of light emitting actions, conducted by the plurality of light emitting means, same as each other, and controls them so as to adjust each of light emitting outputs.

12. The image receiving apparatus of claim 11, wherein;
each of light emitting times of the plurality of light emitting means is set at one scanning time.

13. The image-reading apparatus of claim 8, wherein;
the reading control means makes each of the plurality of light emitting means emits light by applying a plurality of pulses having an equal pulse width in a range of one scanning line, and controls a light emitting action of each of the plurality of light emitting means so that an integrated value of output pulses is equivalent to a light emitting amount necessary for each light emitting wavelength region.

14. The image-reading apparatus of claim 8, wherein;
the reading control means conducts a controlling operation, so that, within a light emitting time in a wavelength region in which a light emitting time for making the light emitting amount necessary for one scanning operation is the longest, the light emitting action for making the light emitting amount necessary for each scanning operation conducted by a light emitting means in another wavelength region is conducted in a mode of equivalent pulses.

15. The image-reading apparatus of claim 8, wherein;
the reading control means conducts a controlling operation, so as to make a start and a stop of an operation of each of the photo receiving means, corresponding to each of the light emitting wavelength regions of the plurality of light emitting means, correspond to the start and the stop of a light emitting action of a light emitting means concerned.

* * * * *